United States Patent [19]
Bazin et al.

[11] 3,970,774
[45] July 20, 1976

[54] ELECTRONIC SIGNAL MIXER

[75] Inventors: Lucas John Bazin, Stratford; Gary Ray Peterson, Runnemede, both of N.J.

[73] Assignee: RCA Corporation, New York, N.Y.

[22] Filed: Mar. 31, 1975

[21] Appl. No.: 563,683

[52] U.S. Cl. .............................. 178/6; 178/DIG. 6; 178/DIG. 16; 307/264
[51] Int. Cl.² ..................... H04N 5/14; H04N 5/20; H04N 5/22
[58] Field of Search ................. 178/6, 6.8, 7.1, 7.2, 178/DIG. 16, DIG. 6; 307/264; 328/142, 143, 144, 145

[56] References Cited
UNITED STATES PATENTS 3,752,905  12/1971  Schneider .................... 178/DIG. 16

*Primary Examiner*—Robert L. Richardson
*Attorney, Agent, or Firm*—Eugene M. Whitacre; Mason DeCamillis

[57] ABSTRACT

An electronic signal mixer is provided for combining first and second signals by additively (or differentially) combining the first and second signals to provide a first output signal. The first and second signals are further combined in a multiplier circuit to provide an output signal which is a differential (or additive) combination of the first and second signals multiplied by a coefficient determined by a control voltage applied to the multiplier. The first combined signal and the product output of the multiplier are further combined to provide a resultant signal comprised of any proportionality of the first and second signals in accordance with the value of the control voltage.

9 Claims, 3 Drawing Figures

ELECTRONIC SIGNAL MIXER

This invention relates to signal processing circuits and more particularly to electronic signal mixer circuits of a type which may be conveniently controlled from a remote location.

In accordance with the present invention, an electronic signal mixer comprises first combining means for additively (or differentially) combining first and second signals. A multiplier which has a first input circuit coupled to receive the first and second signals, a second input circuit for connection to a source of control voltage, provides an output signal which is the differential (or additive combination of said first and second signals multiplied by a coefficient determined by the control voltage. The output signal from the first combining means and the multiplier are combined in a second combining means to provide a resultant signal comprised of any proportionality of the first and second signals in accordance with the value of the control voltage.

Since the proportionate mixture of the two signals is controlled by the control voltage, control of the mixing may be affected without the need for extending the signal paths to the remote location. A particularly advantageous use of an electronic signal mixer, in accordance with the present invention, is for altering the gamma characteristic of a video signal translating channel.

The present invention will be better understood by reference to the accompanying drawings and specification in which.

Figure 1:
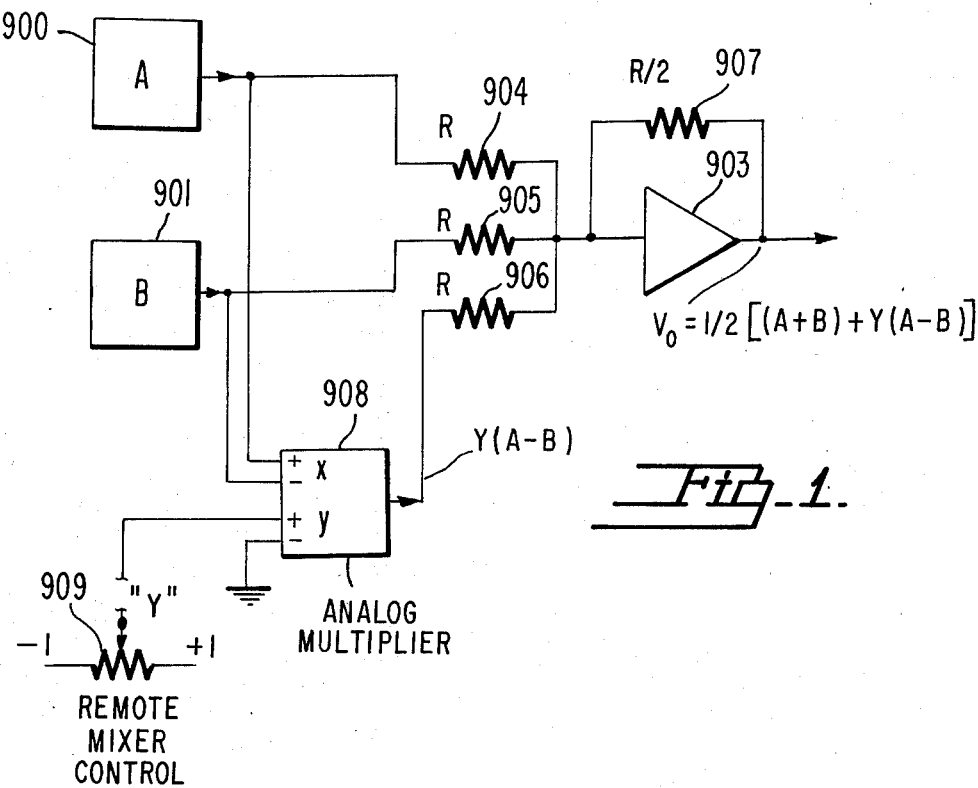
FIG. 1 is a block diagram of a remotely controlled signal mixer circuit embodying the present invention.

In FIG. 1 first and second signals A and B from sources, 900 and 901 respectively, are coupled to a summing amplifier 903 by resistors 904 and 905 of Value R. Summing amplifier 903 has a negative feedback resistor 907 of Value R/2. In accordance with known principles the output signal of amplifier 903 is:

$$A + B/2$$

The first and second signals A and B of signal sources 900, 901 are also coupled to the positive (+) and negative (−) (differential) input terminals of one channel of a linear four quadrant multiplier 908 (for example, a Motorola type MC1595L) identified as the X channel. The Y channel of multiplier 908 is coupled to an adjustable d.c. voltage source 909. Multiplier 908, in accordance with known principles, provides at its output, a signal which is the product of the signals applied to its respective X and Y inputs. As shown in the block diagram of FIG. 1, the X channel has coupled to its respective terminals signals A and B from which the multiplier produces a signal in the form of A−B. The Y channel has coupled to its input terminals a d.c. voltage which is variable, for example, between +1 Volt and −1 Volt and represented by an output Y. Since the output of multiplier 908 is the product of its applied X and Y inputs, the resuultant output signal is: Y (A−B) where Y can be either positive or negative The product signal Y (A−B) is coupled to summing amplifier 903 by resistor 906 of Value R. Amplifier 903 sums the product signal with the original signals A and B to provide at its output terminal an output signal $V_o$ which is a summation of its respective inputs in the form:

$$V_o = \tfrac{1}{2} [(A+B) + Y(A-B)]$$

When the control voltage applied to the Y input of multiplier 908 causes the Y coefficient to assume a value of +1, the output voltage $V_o$ becomes equal to A. When the control voltage is of a value to cause the coefficient Y to assume a value of −1 the output voltage $V_o$ is equal to B. Similarly, when $Y = 0$, $V_o = (A+B)/2$. It can be seen that the mixer circuit of FIG. 1 will provide an output signal whose proportion of signals A and B is continously variable in response to the control voltage.

As previously mentioned, the present invention is particularly advantageous when used as a signal mixer for altering the gamma characteristics of a video signal translating channel.

In a television system it is necessary to process the video signals before transmission to compensate for certain nonlinearities in the respective transmission and receiving systems to ensure that the viewer sees a picture which is a true reproduction of the televised scene. Among the nonlinearities of the system for which compensation must be made are the gamma characteristics of the television receiver picture tube and the television camera pickup tube.

Gamma, as related to a television image, is defined as a numerical indication of the degree of contrast in a television image. Gamma correction of the video signal is necessary to insure that the transmitted television signal will be properly reproduced by a television receiver. Kinescopes used in television receivers generally have a nonlinear characteristic such that the black portions of a video signal are compressed and the white portions of a video signal are stretched. The black to white range, or gray scale, of a monochrome television signal or the luminance portion of a color television signal is represented by amplitude variations of the video signals. Therefore, a video signal varying linearly in amplitude applied to a nonlinear kinescope in a television receiver would result in a picture the contrast range of which would be reduced undesirably according to the nonlinear transfer characteristic of the kinescope. Accordingly, it is desirable to gamma correct the video signal prior to transmission in such a manner that the signal reproduced in a television receiver has the desired contrast range.

Generally, gamma correction is accomplished by passing the video signals derived from the television camera through a nonlinear circuit having a predetermined exponential relationship between input and output to precorrect the signal for the subsequent nonlinear transfer characteristic of the kinescope in the television receiver. While the exponent may be any selected number, it is generally accepted that the nonlinear circuit should provide an output equal to its input raised to the one-half power. The nonlinear circuit providing gamma correction of video signals is usually located in a video signal processing amplifier coupled between the camera pickup tube and the color encoder.

Figure 2:
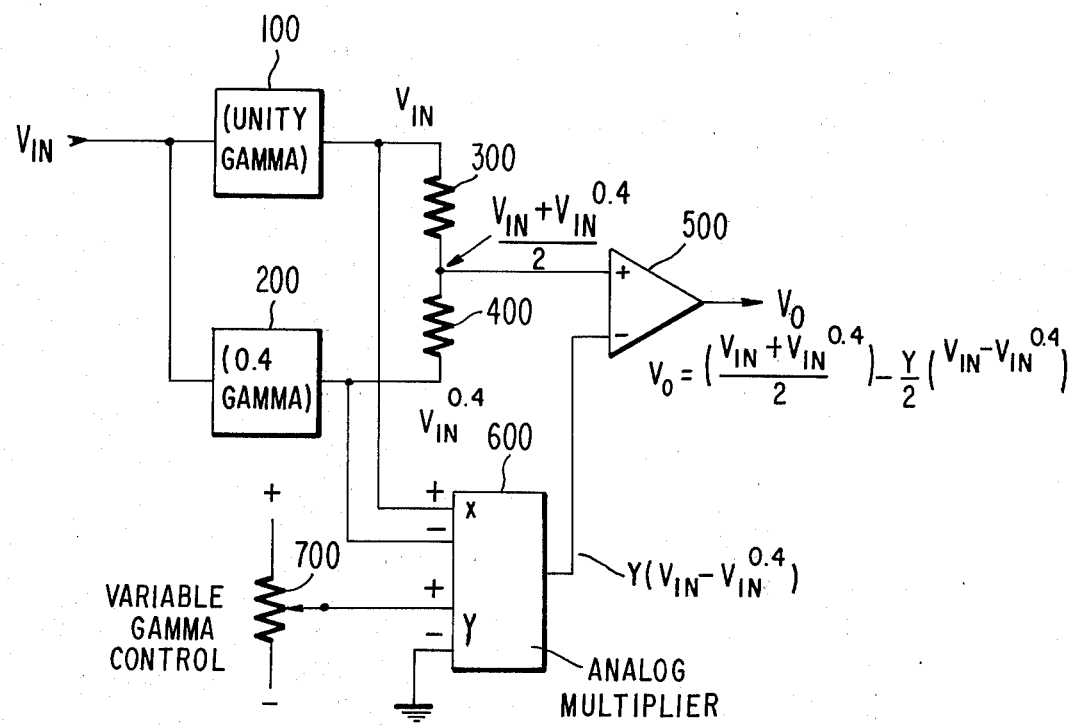
FIG. 2 is a block diagram of a remotely controlled gamma circuit embodying the present invention.

FIG. 2 illustrates the use of the present invention as a remotely controlled gamma correction circuit wherein a source of video signals $V_{IN}$, such as from one of the red, green or blue video signal translating channels of a television camera (not illustrated) is coupled to the input of a linear unity gain amplifier 100 to provide an output signal $V_{IN}$. The source of video signals $V_{IN}$ is further coupled to the input of an amplifier 200 whose transfer function modifies the signal in an exponential manner to provide at its output terminal a nonlinear signal $V_{IN}^{0.4}$.

The respective output signals $V_{IN}$ and $V_{IN}^{0.4}$ of amplifiers 100 and 200 are respectively coupled to the first and second terminals of a two-terminal resistive mixer comprising equal resistors 300 and 400. The common junction of resistors 300 and 400 provide a summation of $V_{IN}$ and $V_{IN}^{0.4}$ in proportion to the value of resistors 300 and 400. Since resistor 300 is equal to resistor 400, and the output impedance of amplifiers 100 and 200 are very low, the summation signal appearing at the junction of resistors 300 and 400 is:

$$\frac{V_{IN} + V_{IN}^{0.4}}{2}$$

The output signals $V_{IN}$ and $V_{IN}^{0.4}$ of amplifiers 100 and 200 are also coupled to the positive (+) and negative (−) differential input terminals of one channel of a linear four quadrant multiplier 600 identified as the X channel. The Y channel of multiplier 600 is coupled to an adjustable d.c. voltage source 700. Multiplier 600, as described in conjunction with FIG. 1, provides at its output, a signal which is the product of the signals applied to its respective X and Y inputs in the form:

$$Y(V_{IN} - V_{IN}^{0.4})$$

Further scaling at the output of the multiplier modifies the signal to:

$$(Y/2)(V_{IN} - V_{IN}^{0.4})$$

The summation signal at the junction of resistors 300, 400 and the product signal at the output of multiplier 600 are coupled to the positive (+) and negative (−) inputs, respectively, of a summing operational amplifier 500. Summing operational amplifier 500 provides at its output terminal a video output signal $V_o$ which is a summation of its respective inputs in the form:

$$V_o = \left(\frac{V_{IN} + V_{IN}^{0.4}}{2}\right) - \frac{Y}{2}(V_{IN} - V_{IN}^{0.4}).$$

In operation as the variable gamma control 700 coupled to the Y input of the multiplier 600 is varied between the selected values of $Y = +1$ to $Y = -1$ the output signal $V_o$ from amplifier 500 will consist of a mixture of $V_{IN}$ and $V_{IN}^{0.4}$ as follows:

When $Y = +1$, $V_o + V_{IN}^{0.4}$

When $Y = -1$, $V_o = V_{IN}$ when $Y = 0$, $V_o = \left(\frac{V_{IN} + V_{IN}^{0.4}}{2}\right)$ Thus, the adjustable gamma circuit of FIG. 2 will provide an output signal $V_o$ whose gamma transfer characteristic is variable in response to a control voltage from a linear reproduction of $V_{IN}$ to a nonlinear reproduction having a predetermined exponential relationship to $V_{IN}$. The ability to control the gamma characteristic of a video signal by means of an external control voltage provides advantageous operating features since the video signal leads need not to be extended, for example, to remote locations for remote manual operation. Similarly, the adjustable gamma circuit may be programmed to operate from a control voltage provided by a detector of the type described in detail in the copending application of John Lucas Bazin, assigned to the same assignee and filed concurrently herewith entitled "Apparatus For Automatic Gamma Control Of Color Television Signals."

Figure 3:
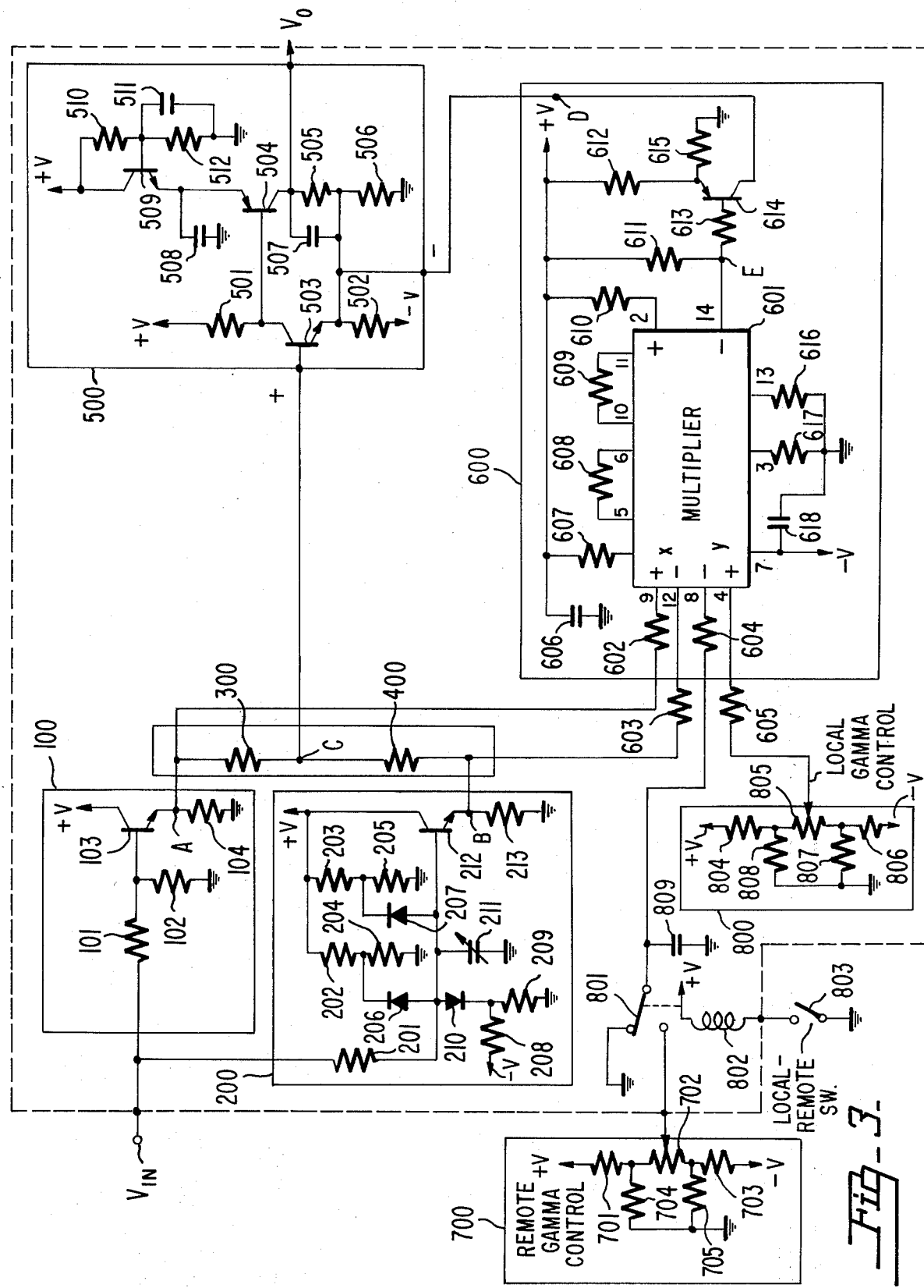
FIG. 3 is a more detailed schematic circuit diagram of a remotely controlled gamma circuit shown in FIG. 2.

FIG. 3 is a more detailed schematic circuit diagram of the remotely controlled gamma circuit of FIG. 2 in which functional groups of components have been identified with the same reference numerals used in FIG. 2.

In FIG. 3 a video signal $V_{IN}$ for which a gamma correction is desired, is coupled to a linear amplifier 100 and to a nonlinear amplifier 200. Amplifier 100 comprises transistor 103 having emitter, base and collector electrodes. The base electrode of transistor 103 receives the applied video signal $V_{IN}$ through a base resistor 101. The base electrode of transistor 103 is coupled to a point of reference, such as ground, by a resistor 102. The collector electrode of transistor 103 is direct coupled to a source of voltage +B. The emitter of transistor 103, is coupled to a point of reference potential, such as ground, by a resistor 104. The junction of the emitter electrode and resistor 104 provides an output terminal A for amplifier 100 at which appears a linear reproduction of the input signal $V_{IN}$.

Amplifier 200 comprises transistor 200 having emitter, base and collector electrodes. The base electrode of transistor 212 receives the applied video signal $V_{IN}$ through a base resistor 201. The collector of transistor 212 is direct coupled to a source of voltage +V. The emitter of transistor 212 is coupled to a point of reference potential by a resistor 213. The junction of the emitter of transistor 212 and emitter resistor 213 provides an output terminal B for amplifier 200. A series of voltage dividers 208,209; 202,204; 203,205 each comprising two resistors are coupled between sources of voltage + or −V as indicated and the point of reference potential. The junction of each two resistors in each voltage divider is coupled to the base electrode of transistor 212 by diodes 210, 206 and 207 respectively. The series of voltage dividers with their respective diodes form a signal shaping network for the signal $V_{IN}$ applied to the base of transistor 212. In the illustrated schematic, component values have been selected to provide at the output terminal B of amplifier 200 a signal equal to the input signal $V_{IN}$ raised to the 0.4 power ($V_{IN}^{0.4}$).

A resistive mixer comprising series connected resistors 300 and 400 is coupled between output terminal A of amplifier 100 and output terminal B of amplifier 200 to additively combine the two signals $V_{IN}$ and $V_{IN}^{0.4}$ at terminal C.

Output terminals A and B are also coupled to the (+) and (−) input terminals of the X channel of a multiplier 600 by resistors 602 and 603. A remote gamma control voltage divider 700 comprising resistors 701, 702, 703, 704 and 705 coupled between voltage sources +V and −V is coupled through relay contacts 801 of relay 802 to the (−) input terminal of the Y channel of multiplier 601 by a resistor 604. A local gamma control voltage divider comprising resistors 804, 805, 806, 807 and 808 coupled between +V and −V is coupled to the (+) input terminal of the Y channel of multiplier 601 by a resistor 605. Multiplier 601 is a commercially available integrated circuit, for example, the Motorola MC1595L. Resistors 607, 608, 609, 610, 611, 616, 617 and capacitors 606 and 618 are used to configure the multiplier 601 for a basic multiply mode of operation wherein the signal at output terminal E is the product of the X and Y input signals or as shown in the illustrated embodiment the signal at terminal E is equal to $$\pm Y (V_{IN} - V_{In}^{0.4}).$$

Terminal E is coupled to a current driver 614 to provide isolation for the signal at terminal E. Current driver 614 comprises transistor 614 having emitter, base and collector electrodes. The base electrode receives the output signal from the multiplier 601 through a resistor 613. The emitter of transistor 614 is coupled to a source of potential +V by a resistor 612. The junction of the emitter of transistor 614 and resistor 612 is coupled to a point of reference potential by a resistor 615. The collector transistor 614 is direct coupled to terminal D.

Terminal C and terminal D are coupled to respective positive (+) and minus (−) terminals of a summing operational amplifier 500. Amplifier 500 includes transistors 503, 504 and 509 each having emitter, base and collector electrodes. The positive (+) terminal is coupled to the base electrode of transistor 503 to provide a first signal input. The collector of transistor 503 is coupled to a source of voltage +V by a resistor 501. The emitter of transistor 503 is coupled to a source of voltage −V by a resistor 502. The junction of the collector electrode of transistor 503 and resistor 501 is coupled to the base electrode of transistor 504. The negative (−) input terminal of amplifier 500 is coupled to the junction of the emitter electrode of transistor 503 and resistor 502 to provide a second signal input. The emitter of transistor 504 is coupled to the emitter of transistor 509. The collector of transistor 509 is direct coupled to a source of voltage +V. Bias for transistor 509 is provided by resistors 510 and 512 coupled between the source of voltage +V and the point of reference potential. The collector of transistor 504 is coupled to the point of reference potential by series resistors 505 and 506. The junction of resistors 505 and 506 is coupled to the junction of the emitter electrode of transistor 503 and resistor 502. The junction of the emitter electrode of transistor 504 and resistor 505 provides an output terminal at which the resultant output voltage $V_o$ appears.

Transistors 503 and 504 provide a summing amplifier for signals applied to the respective positive (+) and minus (−) terminals, and transistor 509 and its associated bias network 510, 572 serve to stabilize the emitter voltage of transistor 504.

In operation, the circuit of FIG. 2 provides a video output signal at terminal $V_o$ Which is a mixture of $V_{IN}$ and $V_{IN}$ raised to an exponential power as heretofore described in reference to the system block diagram of FIG. 2. Additionally, the circuit of FIG. 3 provides means for providing local/remote control of the gamma corrector circuit.

The Local/Remote switch 803 serves to control the energization of relay coil 802 thereby operating relay switch contacts 801. As shown in the unenergized (local) position, relay contacts 801 couple one input of the Y multiplier channel to the point of reference potential. In this condition, the Y multiplicand for the output product of the multiplier 601 is provided by the local gamma control voltage divider 800. In the energized (remote) position, relay contacts 801 couple an external remotely located gamma control voltage divider 700 to the Y multiplier channel of multiplier 601 to provide remote control of the multiplicand Y. Since local gamma control 800 remains coupled to the multiplier 601 during remote operation, gamma control 800 provides a means for making offset and setup adjustments without disturbing the remote gamma control position.

What is claimed is:

1. A signal mixer comprising:
   a pair of terminals for receiving first and second signals respectively;
   first combining means coupled to said pair of terminals for providing an additive combination of said first and second signals;
   a multiplier having a first input circuit coupled to said pair of terminals, a second input circuit for connection to a source of control voltage, and an output circuit for developing an output signal which is an additive combination of said first and second signals multiplied by a coefficient determined by said control voltage;
   second combining means coupled to said first combining means to receive the additive combination of said first and second signals, and coupled to said multiplier output circuit to receive the additive combination of said first and second signals multiplied by said coefficient, one of said additive combinations of said first and second signals produced by said first combining means and said multiplier comprising the difference between said first and second signals and the other of said additive combinations comprising the sum of said first and second signals.

2. A signal mixer according to claim 1 wherein said first signal is a video signal and said second signal has a predetermined exponential relationship to said video signal.

3. A signal mixer according to claim 1 wherein said first and second combining means comprises an amplifier whose output signal is a summation of the input signals applied thereto.

4. A signal mixer according to claim 1 wherein said control voltage is remotely located from said signal mixer.

5. A signal mixer for altering the gamma characteristics of a video signal translating channel comprising:
   a source of video signals $V_{IN}$;
   means for providing a source of nonlinear video signals having a predetermined exponential relationship to said video signals;
   first combining means coupled to said video signals and said nonlinear video signals for providing an additive combination of said video and nonlinear video signals;
   a multiplier having a first input circuit coupled to said video and said nonlinear video signals, a second input circuit for connection to a source of control voltage, and an output circuit for developing an output signal which is an additive combination of said video and said nonlinear video signals multiplied by a coefficient determined by said control voltage;

second combining means coupled to said first combining means to receive the additive combination of said video and nonlinear video signals, and coupled to said multiplier output circuit to receive the additive combination of said video and said nonlinear signals multiplied by said co-efficient, one of said additive combinations of said video and nonlinear video signals produced by said first combining means and said multiplier comprising the difference between said video and said nonlinear video signals and the other of said additive combinations comprising the sum of said video and nonlinear video signals.

6. A signal mixer according to claim 5 wherein said first combining means comprises a resistive voltage divider.

7. A signal mixer according to claim 5 wherein said second combining means comprises a differential amplifier.

8. A signal mixer according to claim 5 wherein said nonlinear source of video signals comprises said video signals raised to the one-half power.

9. A signal mixer according to claim 5 wherein said control voltage is remotely located from said signal mixer.

* * * * *